United States Patent
Hamada et al.

(10) Patent No.: US 9,676,046 B2
(45) Date of Patent: Jun. 13, 2017

(54) ELECTRICAL DISCHARGE MACHINING METHOD

(75) Inventors: Kyoichi Hamada, Aiko-gun (JP); Nobuaki Igi, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 288 days.

(21) Appl. No.: 14/418,899

(22) PCT Filed: Jul. 31, 2012

(86) PCT No.: PCT/JP2012/069473
§ 371 (c)(1),
(2), (4) Date: Jan. 30, 2015

(87) PCT Pub. No.: WO2014/020700
PCT Pub. Date: Feb. 6, 2014

(65) Prior Publication Data
US 2015/0209883 A1    Jul. 30, 2015

(51) Int. Cl.
*B23H 9/14* (2006.01)
*B23H 9/10* (2006.01)
*B23H 1/00* (2006.01)

(52) U.S. Cl.
CPC ............... *B23H 9/14* (2013.01); *B23H 9/10* (2013.01); *B23H 1/00* (2013.01)

(58) Field of Classification Search
CPC .............. B23H 1/00; B23H 9/10; B23H 9/14
See application file for complete search history.

(56) References Cited

U.S. PATENT DOCUMENTS

| 2,902,584 | A | * | 9/1959 | Ullmann | B23H 9/00 219/69.15 |
| 4,349,716 | A | * | 9/1982 | Di Piazza | B23H 7/26 219/69.15 |
| 7,041,933 | B2 | * | 5/2006 | Forrester | B23H 7/26 219/69.17 |
| 2002/0148814 | A1 | * | 10/2002 | Ishiwata | B23H 1/00 219/69.2 |

(Continued)

FOREIGN PATENT DOCUMENTS

| JP | 8-118157 | 5/1996 |
| JP | 2000-343000 | 12/2000 |
| JP | 2001-212723 | 8/2001 |

(Continued)

OTHER PUBLICATIONS

Machine translation of Japan Patent No. 2006-346,752, Jan. 2017.*

(Continued)

*Primary Examiner* — Geoffrey S Evans
(74) *Attorney, Agent, or Firm* — Morrison & Foerster LLP

(57) ABSTRACT

An electrical discharge machining method includes a step in which a pipe electrode is arranged such that the axis line of the pipe electrode faces the depth direction of the through-holes, the pipe electrode is moved relative to the workpiece, and a sloped section is formed; a step in which a straight section connected to the sloped section is formed; and a step in which the pipe electrode is arranged such that the axis line is vertical relative to the inside wall surface of the sloped section, the pipe electrode is moved relative to the workpiece, and the inside wall surface is machined.

4 Claims, 7 Drawing Sheets

(56) References Cited

U.S. PATENT DOCUMENTS

2004/0200807 A1    10/2004   Forrester et al.

FOREIGN PATENT DOCUMENTS

JP       2006-346752          12/2006
JP       2006-346752 A    *  12/2006
JP       2007-190671           8/2007

OTHER PUBLICATIONS

International Search Report mailed Oct. 30, 2012, directed to International Application No. PCT/JP2012/069473; 2 pages.
Yang, L. (Apr. 2009). "Research on a High Speed Electric Spark Machining Process for Gas Film Holes on High Turbine Blades," Dalian University of Technology, pp. 48-49.

* cited by examiner

FIG. 10
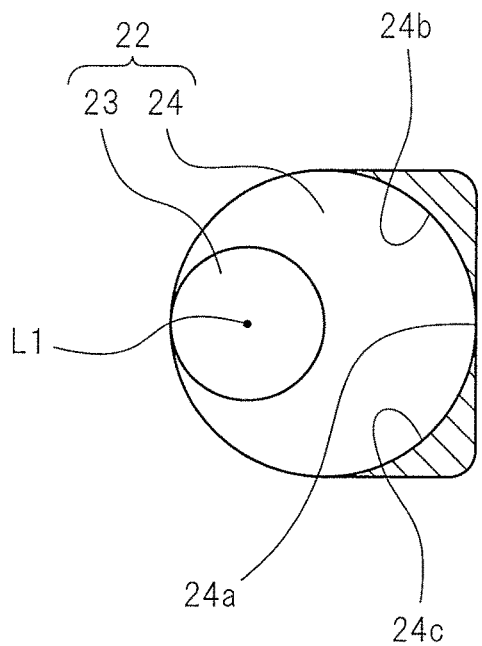
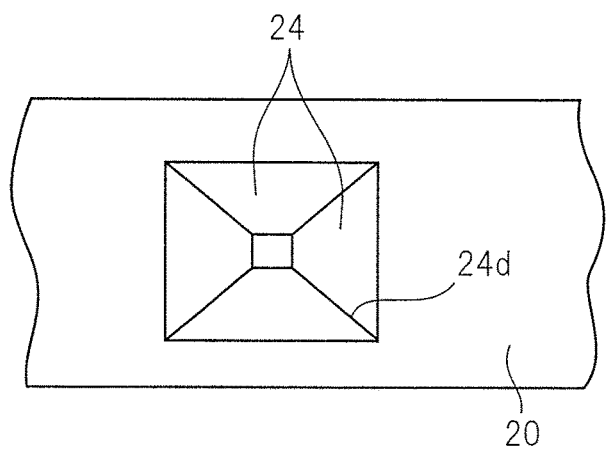
FIG. 11A
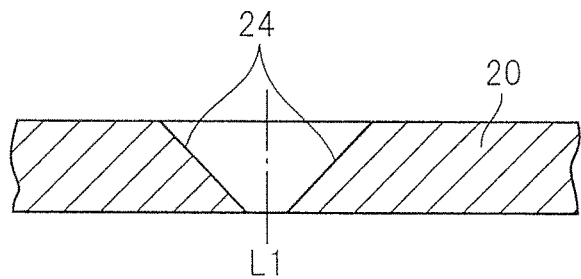
FIG. 11B

ELECTRICAL DISCHARGE MACHINING METHOD

CROSS REFERENCE TO RELATED APPLICATIONS

This application is a U.S. National Phase patent application of PCT/JP2012/069473, filed on Jul. 31, 2012, which is hereby incorporated by reference in the present disclosure in its entirety.

FIELD OF THE INVENTION

The present invention relates to an electrodischarge machining method which uses an electrodischarge machine to form a hole in a turbine blade etc.

BACKGROUND OF THE INVENTION

In the past, there has been known an electrodischarge machining method which uses an electrodischarge machine to form a hole of a diffuser shape (for example, see PLT 1). In the machining method which is described in this PLT 1, an electrode holder is used to hold a pipe shaped pipe electrode, the pipe electrode is made to move relative to the workpiece in the XY plane while making it advance in a plate thickness direction (Z-direction), and a through hole which has a diffuser shaped taper (gradient) part and straight part which is connected with the taper part is formed in the workpiece. For the pipe electrode, one which has an electrode diameter of the same extent as the minimum width of the straight part is used.

When forming a cross-sectional rectangular shaped through hole using the machining method which is described in PLT 1, the corner parts of the inside wall surfaces of the taper part become arc shapes with radii of curvature corresponding to the electrode diameter of the pipe electrode, so the shape of the taper part is restricted by the electrode diameter. For this reason, it is difficult to form, for example, arc parts of radii of curvature smaller than the electrode diameter of the pipe electrode at the inside wall surfaces of the taper part or otherwise form the taper part into various shapes.

PATENT LITERATURE

PLT 1: Japanese Patent Publication No. 2006-346752A

SUMMARY OF THE INVENTION

The present invention provides an electrodischarge machining method which uses an electrodischarge machine which is provided with a columnar or cylindrical shaped electrode so as to form a hole which has an inclined part in a workpiece, comprising an inside wall surface machining process which arranges the electrode so that an axis of the electrode becomes vertical to an inside wall surface of the inclined part while making the electrode move relative to the workpiece to machine the inside wall surface of the inclined part by electrodischarge machining.

Further, the present invention provides an electrodischarge machining method which uses an electrodischarge machine which is provided with a columnar or cylindrical shaped electrode so as to form a through hole which has a straight part and an inclined part connected with the straight part in a workpiece, comprising an inclined part machining process which arranges the electrode so that an axis of the electrode extends in a depth direction of the through hole while making the electrode move relative to the workpiece and uses electrodischarge machining to form the inclined part, a straight part machining process which arranges the electrode so that the axis extends in the depth direction of the through hole while making the electrode move relative to the workpiece and uses electrodischarge machining to form the straight part, and an inside wall surface machining process which arranges the electrode so that the axis becomes vertical to an inside wall surface of the inclined part which is formed by the inclined part machining process while making the electrode move relative to the workpiece to machine the inside wall surface of the inclined part by electrodischarge machining.

BRIEF DESCRIPTION OF THE DRAWINGS

FIG. 10 is a view which shows a modification of FIG. 5.

FIGS. 11A and 11B are views of another modification of a through hole which is formed in a workpiece by the electrodischarge machining method of the present invention, wherein FIG. 11B is a plan view of a through hole and FIG. 11B is a cross-sectional view of a through hole.

FIGS. 12A and 12B are views of another modification of a through hole which is formed in a workpiece by the electrodischarge machining method of the present invention, wherein FIG. 12A is a plan view of a through hole and FIG. 12B is a cross-sectional view of a through hole.

DETAILED DESCRIPTION OF THE INVENTION

Figure 1:
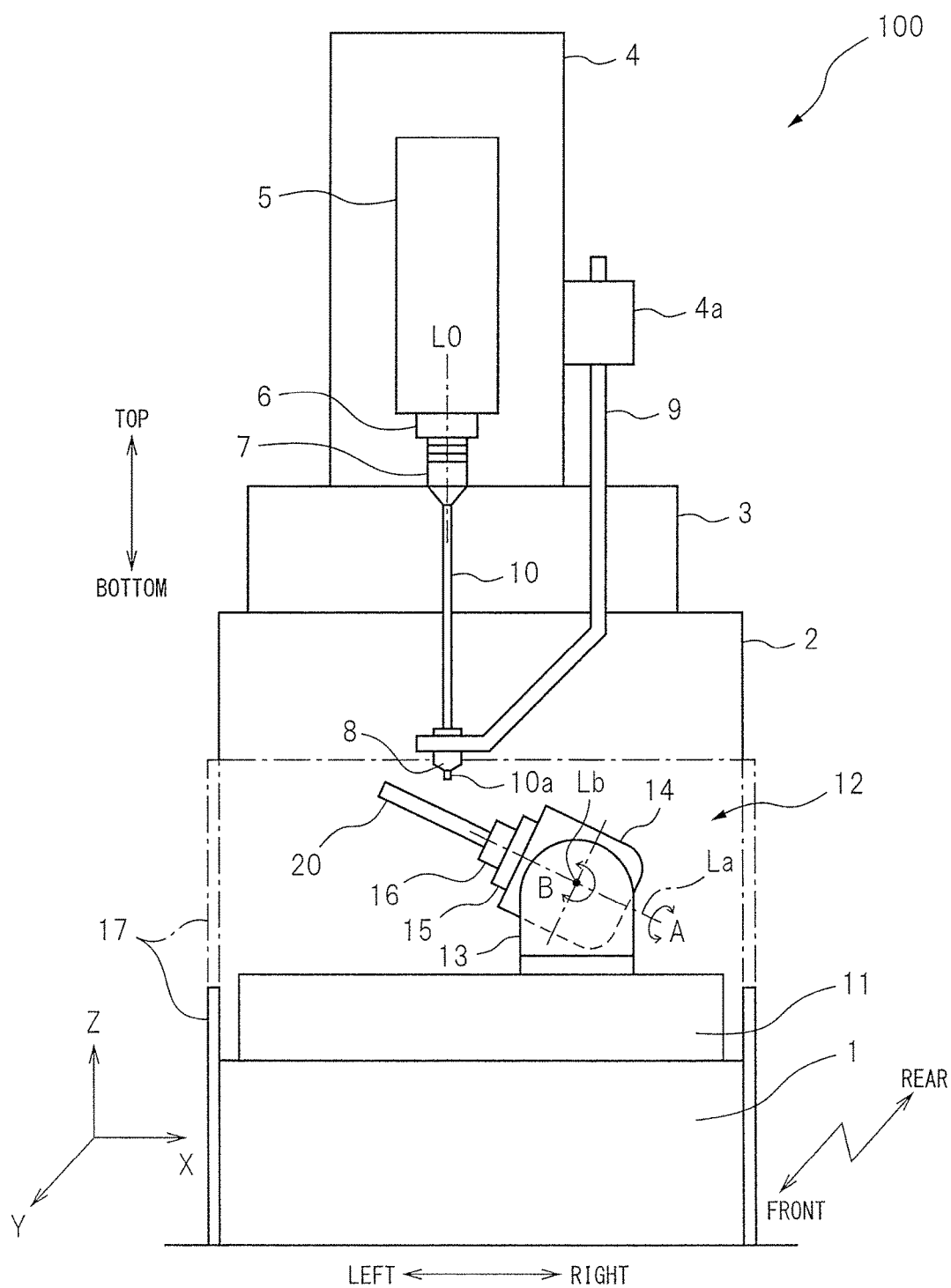
FIG. 1 is a front view which schematically shows the basic configuration of an electrodischarge machine to which the present invention is applied.

Below, referring to FIG. 1 to FIG. 12B, one embodiment of an electrodischarge machining method according to the present invention will be explained. FIG. 1 is a front view which schematically shows the configuration of the main parts of the electrodischarge machine 100 to which the electrodischarge machining method according to the embodiment of the present invention is applied. Note that, below, for convenience, as illustrated, the orthogonal 3-axial directions (X-axis direction, Y-axis direction, and Z-axis direction) are respectively defined as the left-right direction, front-rear direction, and top-bottom direction and the configurations of the parts are explained in accordance with these definitions.

In FIG. 1, at the rear of a foundation formed by a bed 1, a column 2 is provided standing up. At the top surface of the column 2, an X-slider 3 is supported to be able to slide in the X-axis direction (left-right direction). On the top surface of the X-slider 3, a ram 4 is supported to be able to move in the Y-axis direction (front-rear direction). At the front surface of the ram 4, a spindle head 5 is supported to be able to move in the Z-axis direction (top-bottom direction). At the bottom surface of the spindle head 5, a front end part of the rotary spindle 6 sticks out. At the bottom part of the rotary spindle 6, an electrode holder 7 is attached. Below the electrode holder 7 in the vertical direction, an electrode guide 8 is arranged. The electrode guide 8 is supported at a bottom end part of a holding arm 9. The holding arm 9 is supported by a bracket 4a which is provided at a right side surface of the ram 4 to be able to move in the top-bottom direction.

Between the electrode holder 7 and the electrode guide 8, an electrode 10 extends along an axis L0 in the top-bottom direction passing through the centers of the electrode holder 7 and the electrode guide 8. The electrode 10 is a cylindrical shaped pipe electrode and a top end part of the electrode 10 is supported by electrode holder 7. The bottom end part of the pipe electrode 10 runs through the electrode guide 8 in the top-bottom direction. The pipe electrode 10 is supported at the outer circumference by the electrode guide 8 and the position is retrained in the front-rear and left-right directions while the pipe electrode 10 is able to slide in the electrode guide 8 in the top-bottom direction. Inside the pipe electrode 10, for example, water or other machining fluid is supplied. The machining fluid is ejected from the front end part (bottom end part) of the pipe electrode 10. Note that, for the machining fluid, oil may also be used. The bottom surface of the pipe electrode 10 is formed flat.

At the top surface of the bed 1, a table 11 is arranged at the front of the column 2. At the top surface of the table 11, a slanted rotary table device 12 is carried. The slanted rotary table device 12 has a front-rear pair of support members 13 which are provided sticking upward from the top surface of the table 11, a slanted member 14 which is supported between the front-rear support members 13 to be able to pivot in the B-axis direction about a pivot axis Lb which extends in the Y-axis direction, and a rotary table 15 which is supported at a left end surface of the slanted member 14 to be able to rotate in the A-axis direction about a rotation axis La which is vertical to the pivot axis Lb. The rotary table 15 is provided with a chuck 16. The chuck 16 supports a workpiece 20. Around the table 11, a machining tank 17 is provided so as to be able to rise to cover the entire table 11 and slanted rotary table device 12. Note that, the one-dot chain line of the figure shows the state where the machining tank 17 is raised.

While not illustrated, the electrodischarge machine 100 of FIG. 1 has an X-axis use drive part which makes the X-slider 3 move in the left-right direction, a Y-axis use drive part which moves the ram 4 in the front-rear direction, a Z-axis use drive part which moves the spindle head 5 in the top-bottom direction, a spindle drive part which rotates the rotary spindle 6 about the axis L0, an arm drive part which moves the holding arm 9 in the top-bottom direction, a B-axis use drive part which makes the pivot member 14 slant via the pivot axis Lb, and an A-axis use drive part which makes the rotary table 15 rotate via a rotation axis La. The X-axis use drive part, the Y-axis use drive part, the Z-axis use drive part, and the arm drive part are, for example, comprised of ball screws and servo motors which drive rotation of the ball screws, the spindle drive part is, for example, comprised of a spindle motor, and the B-axis use drive part and A-axis use drive part are, for example, comprised of DD (direct drive) servo motors. These servo motors, spindle motor, and DD servo motors are driven controlled in accordance with a predetermined machining program by a not shown NC device.

By the above configuration, the electrode holder 7 and the electrode guide 8 can move relative to the workpiece 20 in the X-axis direction, Y-axis direction, and Z-axis direction and can move relative to the workpiece 20 in the B-axis direction and A-axis direction. Therefore, the workpiece 20 can be machined to a desired three-dimensional shape. Further, by the arm drive part raising and lowering the holding arm 9, the distance between the electrode holder 7 and the electrode guide 8 can be adjusted. Despite consumption of the pipe electrode 10 and resultant change in length of the pipe electrode 10, during machining, the electrode holder 7 and the electrode guide 8 can always support the top-bottom ends of the pipe electrode 10.

The workpiece 20 is, for example, a turbine blade or vane which is used for a gas turbine or jet engine etc. The turbine blade is exposed to a 1000° C. to 1500° C. or so high temperature gas, so a high heat resistant nickel alloy is used as the constituent material. At the surface of this turbine blade, for cooling the surface of the turbine blade, cooling holes are formed for passing cooling air. A nickel alloy is hard to machine, so it is difficult to use a drill etc. to form cooling holes. Therefore, in the present embodiment, an electrodischarge machine 100 is used to form the cooling holes in the turbine blades.

Figure 2:
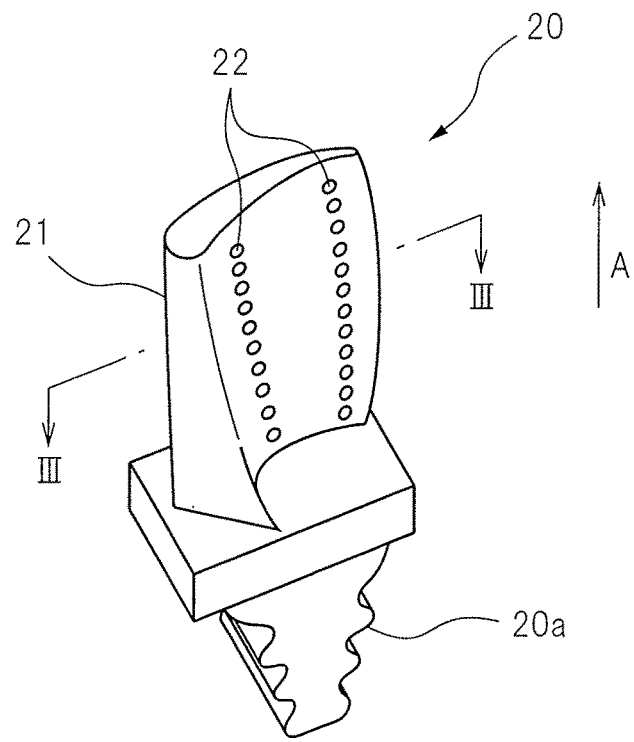
FIG. 2 is a perspective view of a turbine blade of one example of a workpiece to which the present invention is applied.
Figure 3:
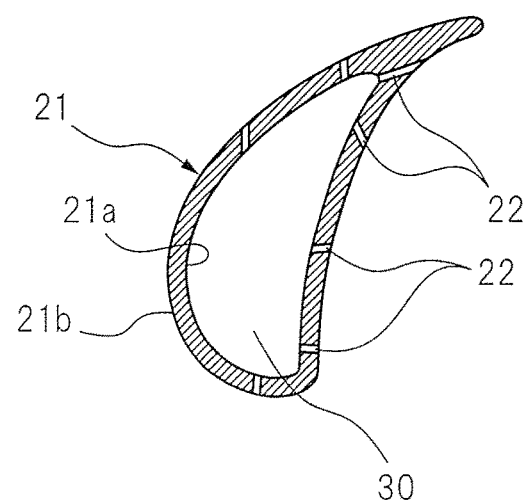
FIG. 3 is a cross-sectional view along the line III-III of FIG. 2.

FIG. 2 is a perspective view of a workpiece 20 (turbine blade), while FIG. 3 is a cross-sectional view along the line III-III of FIG. 2. At one end part of the turbine blade 20, for example, a Christmas tree shaped support part 20a is provided. The support part 20a is attached to the circumference of a rotatable rotor. Note that, below, the height direction of the turbine blade 20 (arrow mark A of FIG. 2) will sometimes be referred to as the "diametrical direction".

As shown in FIGS. 2 and 3, the turbine blade 20 is, for example, formed by the lost wax casting method. Inside the blade part 21, a hollow part 30 is formed. The blade part 21 has an inside surface 21a which faces the hollow part 30 and an outer surface 21b which is exposed to high temperature gas. The blade part 21 is formed with a large number of cooling holes 22 which pass through the blade part 21 at a plurality of locations in the circumferential direction of the blade part 21 and along the height direction A of the blade part 21. At the hollow part 30, cooling air is supplied from the rotor side. Cooling air flows out from the cooling holes 22. Due to this, film-shaped cooling air flows out along the outer surface 21b whereby the blade part 21 is cooled.

Figure 4:
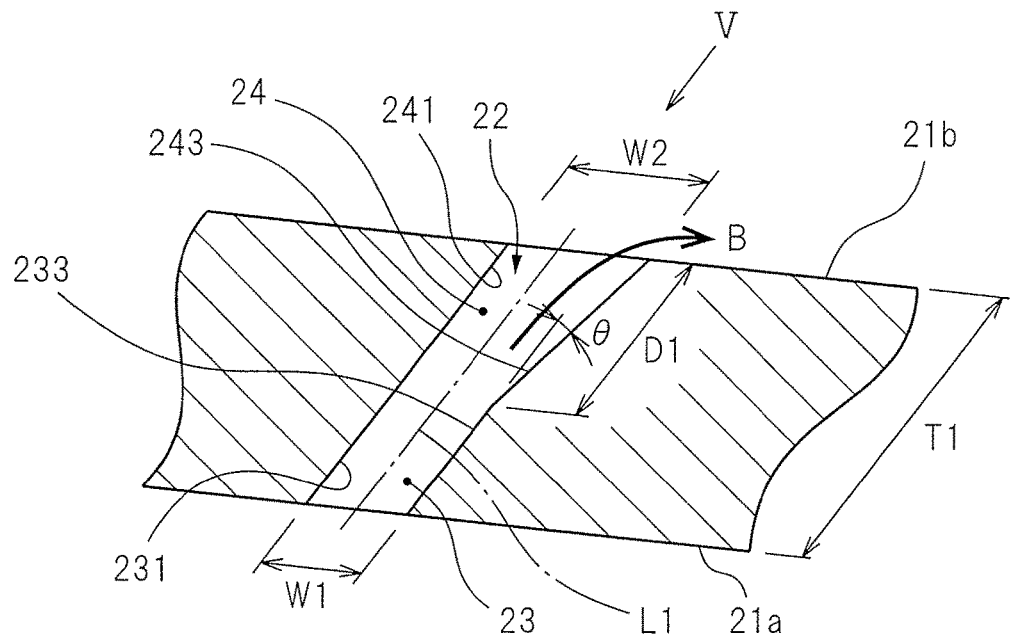
FIG. 4 is an enlarged view of principal parts of FIG. 3 which shows the cross-sectional shape of a cooling hole.
Figure 5:
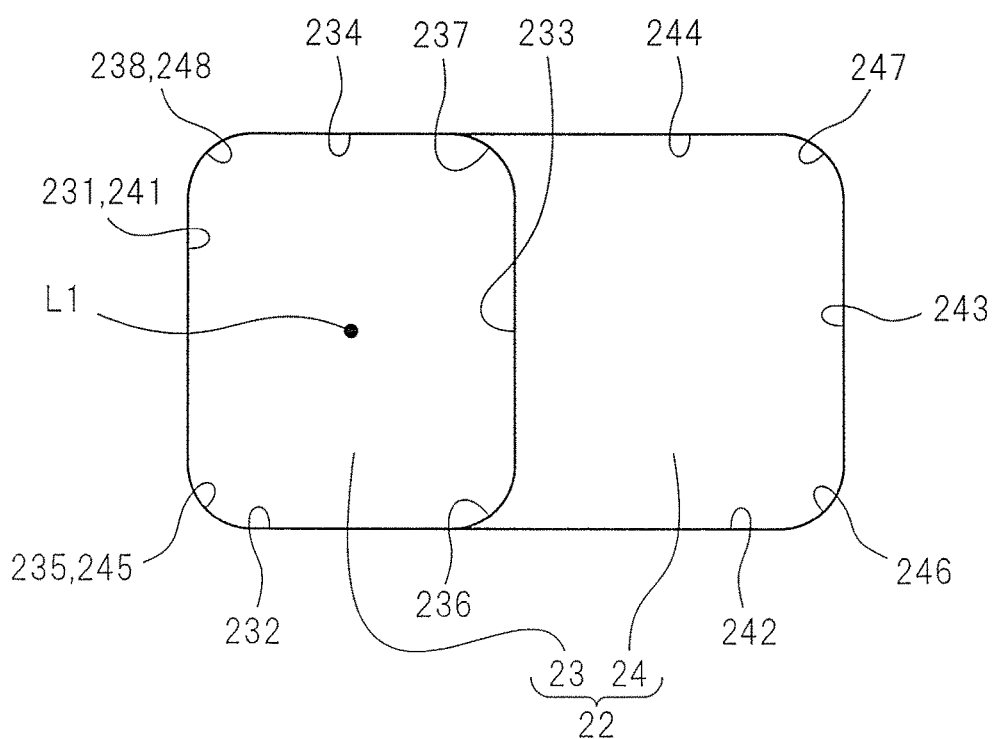
FIG. 5 is a view along the arrow V of FIG. 4.

FIG. 4 is an enlarged view of principal parts of FIG. 3 and shows the cross-sectional shape of a cooling hole 22, while FIG. 5 is a view along the arrow V of FIG. 4 which shows a cooling hole 22 from the outer surface 21b side along the center axis L1. As shown in FIG. 4, the cooling hole 22 has a straight part 23 which extends straight along the center axis L1 of the cooling hole 22 and has a constant cross-sectional area and a diffuser shaped inclined part 24 which is connected with the straight part 23 and has a cross-sectional area which expands gradually toward the outer surface 21b. As shown in FIG. 5, the straight part 23 has four inside wall surfaces 231 to 234 and four corner parts 235 to 238 where the inside wall surfaces 231 to 234 intersect and has a cross-section of a substantially rectangular shape. The inclined part 24, in the same way, has four inside wall surfaces 241 to 244 and four corner parts 245 to 248 where the inside wall surfaces 241 to 244 intersect and has a cross-section of a substantially rectangular shape.

More specifically, the inside wall surface 231 of the straight part 23 and the inside wall surface 241 of the inclined part 24 connected to it are positioned on the same plane, while the inside wall surface 233 and the inside wall surface 243 which face the inside wall surfaces 231 and 241 are not on the same plane. The inside wall surface 243 is slanted from the center axis L1 to the outside by exactly a predetermined angle θ, that is, in a direction away from the center axis L1. Due to this, cooling air which passes through the straight part 23 diffuses along the inside wall surface 243, the cooling air which flows out from the cooling hole 22 can flow along the surface of the turbine blade 20 in a desired direction, that is, as shown by the arrow mark B of FIG. 4, in a slanted direction of the inside wall surface 243, and the surface of the turbine blade 20 can be efficiently cooled.

The other inside wall surfaces 232 and 234 of the straight part 23 and the inside wall surfaces 242 and 244 of the inclined part 24 connected with them are on the same planes. Note that, the inside wall surfaces 242 and 244 may also be provided slanted to the outside from the inside wall surfaces 232 and 234. In FIG. 4, if giving one example of the dimensions of the cooling hole 22, the thickness T1 of the blade part 21 is 1 mm to 3 mm, the depth D1 of the inclined part 24 is 0.5 mm, the slant angle θ of the inside wall surface 243 is 10°, the width W1 of the straight part is 0.3 mm to 0.5 mm, and the width W2 of the inclined part 24 at the outer surface 21b is 0.8 mm. As the pipe electrode 10, one which has an electrode diameter smaller than the minimum width of the cooling hole 22 by exactly the amount of a slight interval is used.

When forming such a cooling hole 22 by the electrodischarge machine 100, the following such method may be considered. That is, first, the pipe electrode 10 is arranged with respect to the outer surface 21b of the workpiece 20 so that the pipe electrode 10 becomes parallel in axis L0 to the center axis L1 of the cooling hole 22. In this state, the pipe electrode 10 is made to move relative to the workpiece 20 in the XY directions while making it move relative to it in the Z-direction as well so as to successively form the inclined part 24 and the straight part 23. With this method, the corner parts 245 to 248 of the inclined part 24 and the corner parts 235 to 238 of the straight part 23 become arc shapes (rounded shapes) which have radii of curvature corresponding to the radius of the pipe electrode 10.

In this regard, the inclined part 24 is provided at the cooling hole 22 at the turbine blade 20 to restrict the outflow direction of the cooling air. That is, cooling air is run along the inside wall surface 243 of the inclined part 24 so as to obtain the desired flow of air (flow along arrow mark B direction) along the outer surface 21b of the turbine blade 20. For this reason, if the radii of curvature of the corner parts 246 and 247 at the both sides of the inside wall surface 243 become larger, the inside wall surface 243 is reduced in area and the flow in the arrow mark B direction is obstructed. Therefore, the radii of curvature of the corner parts 246 and 247 at the both sides of the inside wall surface 243, in particular, the radii of curvature in the vicinity of the outer surface 21b, are preferably smaller.

Regarding this point, to reduce the radii of curvature of the corner parts 246 and 247, it may be considered to use a pipe electrode 10 with a small electrode diameter. However, in this case, the machining time of the cooling hole 22 becomes longer, so this is not suited for machining a turbine blade 20 in which a large number of cooling holes 22 have to be formed. Therefore, in the present embodiment, to reduce the radii of curvature of the corner parts 246 and 247 at the both sides of the inside wall surface 243 regardless of the electrode diameter of the pipe electrode 10, the following electrodischarge machining method is employed.

The electrodischarge machining method according to the present embodiment is a method of forming a cooling hole 22 in a blade part 21 and, in particular, includes an inclined part machining process which forms the inclined part 24, a straight part machining process which forms the straight part 23, and an inside wall surface machining process which machines the inside wall surface 243 of the inclined part 24. Below, these processes will be explained in accordance with the machining routine.

(1) Inclined Part Machining Process

First, the support part 20a of the workpiece 20 (FIG. 2) is held by a chuck 16 of the slanted rotary table apparatus 12. Furthermore, the slanted rotary table apparatus 12 is driven to adjust the posture of the workpiece 20 so that the center axis L1 of the formed cooling hole 22 extends in the top-bottom direction, that is, so that it becomes parallel to the axis L0 of the pipe electrode 10. Next, the front end part of the pipe electrode 10 is made to approach the machining start position on the outer surface 21b of the workpiece 20. Further, due to rotation of the rotary spindle 6, the pipe electrode 10 is made to rotate by a predetermined speed (for example 1000 rpm) while applying a pulse voltage to the pipe electrode 10 from a not shown machining use power source to generate an electrodischarge between the pipe electrode 10 and workpiece 20 and perform electrodischarge machining.

Figure 6:
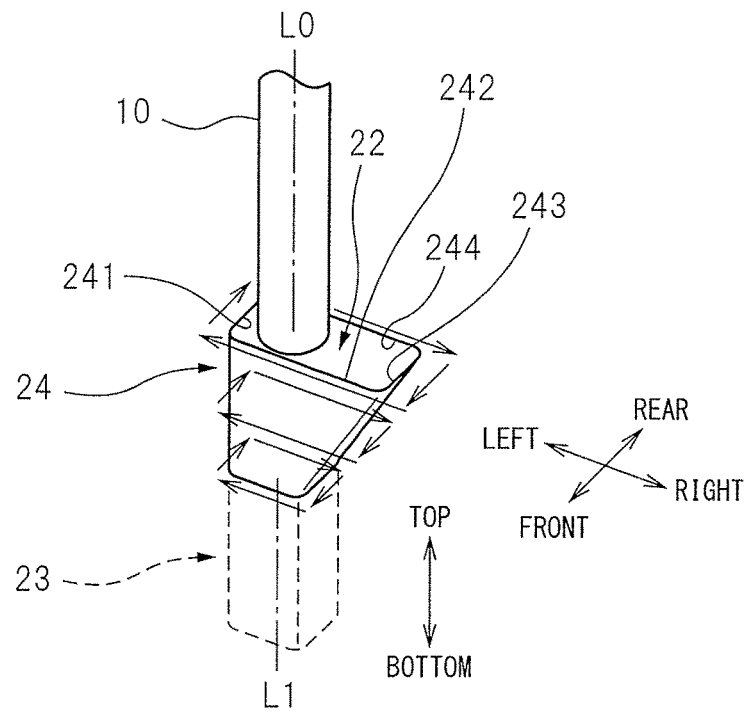
FIG. 6 is a view which shows a path of movement of a pipe electrode in an inclined part machining process which is included in an electrodischarge machining method according to an embodiment of the present invention.

FIG. 6 is a view which shows a path of movement of the pipe electrode 20 in the inclined part machining process. Note that, FIG. 6 shows the front-rear, left-right, and top-bottom directions corresponding to FIG. 1. Below, to facilitate understanding of the explanation, as shown in FIG. 6, assume that the center axis L0 of the workpiece 20 extends in the top-bottom direction (Z-axis direction) and in that state the inside wall surface 243 of the inclined part 24 is slanted to the right.

At the time of machining the inclined part 24, for example, the front end part of the pipe electrode 10 is made to move relative to the workpiece 20 in the front-rear and left-right directions (arrow mark directions of FIG. 6) corresponding to the inside wall surfaces 241 to 244 of the cooling hole 22 and circumference and bottom surface of the pipe electrode 10 are used to machine the blade part 21 in a laminar form. This laminar machining is repeated while making the front end part of the pipe electrode 10 gradually descend and forming an inclined part 24 of a predetermined depth D1. At this time, along with forming the inside wall surfaces 241 to 244, arc shaped corner parts 245 to 248 (FIG. 5) which have radii of curvature corresponding to the electrode diameter of the pipe electrode 10 are formed. Note that, at the time of electrodischarge machining, the inside of the pipe electrode 10 is supplied with machining fluid and high pressure machining fluid is sprayed from the bottom surface 10a of the pipe electrode 10 to blow off the removed chips.

(2) Inside Wall Surface Machining Process

Figure 7:
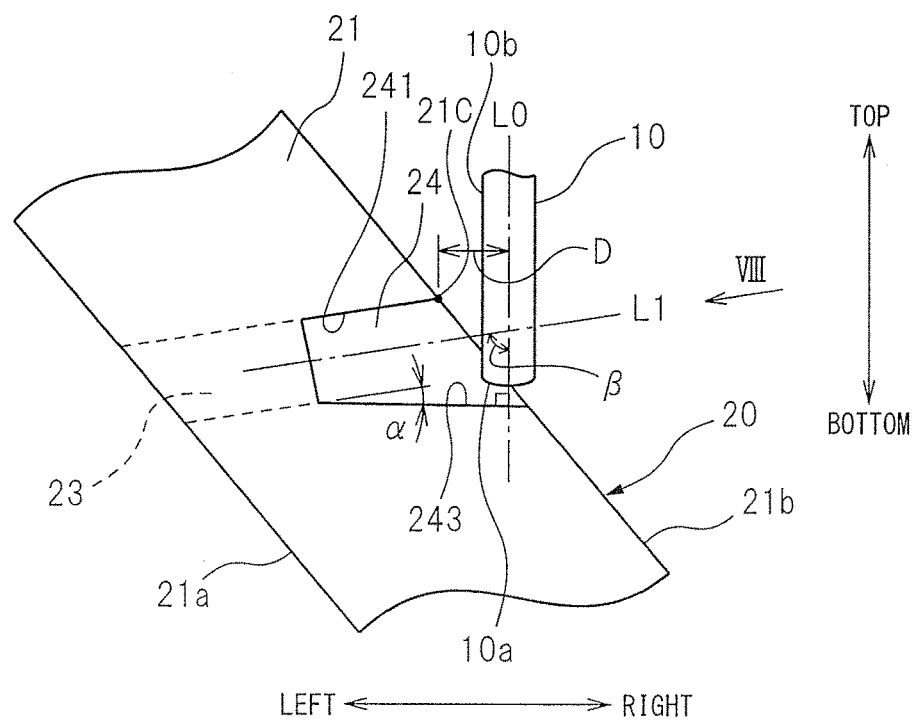
FIG. 7 is a view which explains an operation in an inside wall surface machining process which is included in an electrodischarge machining method according to an embodiment of the present invention.

Next, as shown in FIG. 7, the workpiece 20 is changed in posture so that the bottom surface of the pipe electrode 10 faces the inside wall surface 243 of the inclined part 24. That is, the pivot member 14 of the slanted rotary table device 12 is made to incline from the state of FIG. 6 about the pivot axis Lb by exactly a predetermined angle β (=90°−α) to tilt the workpiece 20 so that the inside wall surface 243 of the inclined part 24 becomes vertical to the axis L0.

Figure 8:
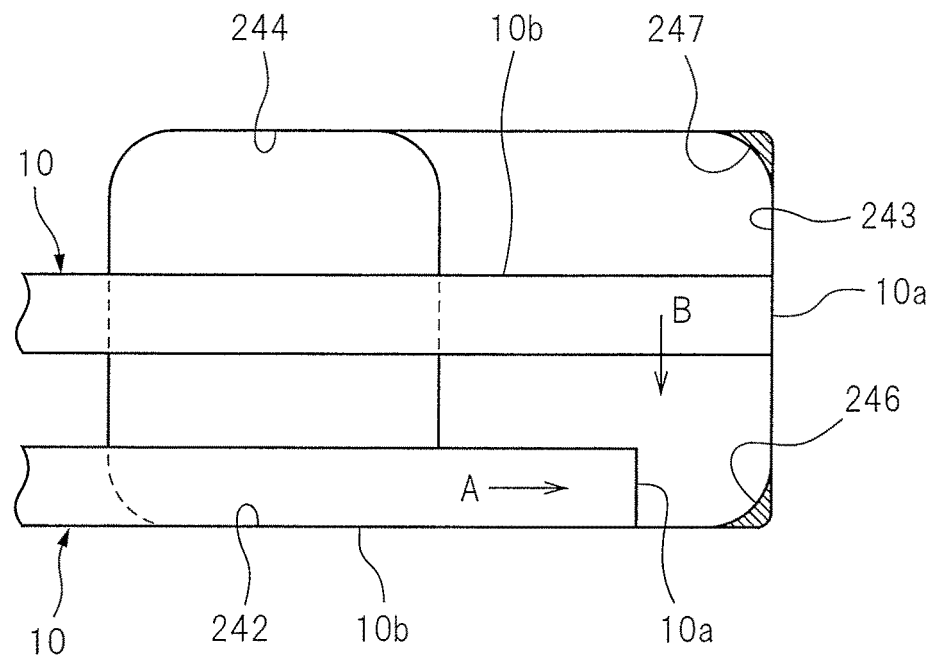
FIG. 8 is a view along the arrow VIII of FIG. 7.

FIG. 8 is a view along the arrow VIII of FIG. 7, that is, a view of the inclined part 24 from the outer surface 21b side along the center axis L1. In the inside wall surface machining process, the bottom surface 10a of the pipe electrode 10 is made to face the inside wall surface 243. In that state, the pipe electrode 10 is made to move relative to the workpiece 20 and the corner parts 246 and 247 (hatched parts in FIG. 8) of the both sides of the inside wall surface 243 are machined. For example, as shown by the arrow mark A of FIG. 8, the bottom surface 10a of the pipe electrode 10 is moved along the inside wall surfaces 242 and 244 to approach the corner parts 246 and 247, that is, the pipe electrode 10 descends and the bottom surface 10a of the pipe electrode 10 is used to form the corner parts 246 and 247 by electrodischarge machining. Alternatively, as shown by the arrow mark B of FIG. 8, in the state with the bottom surface 10a of the pipe electrode 10 approaching the inside wall surface 243, the circumference 10b of the pipe electrode 10 is moved to approach the corner parts 246 and 247, that is, the pipe electrode 10 is moved in the front-rear direction, and the circumference 10b of the pipe electrode 10 is used to form the corner parts 246 and 247 by electrodischarge machining.

This process is repeated over, for example, the entire regions of the corner parts 246 and 247 or over a predetermined length from the inlet of the cooling hole 22, while making the pipe electrode 10 move relative to the inlet of the cooling hole 22 in the depth direction (left in FIG. 7). Due to this, it is possible to make the radii of curvature of at least the arc shaped corner parts 246 and 247 at the outer wall surface 21b of the inclined part 24 smaller (for example, make the radii of curvature 0) and possible to make a larger amount of cooling air flow out along the inside wall surface 243 in the desired direction. Note that, when making the pipe electrode 10 move to the left, when the distance D from the circumference 10b of the pipe electrode 10 which is shown in FIG. 7 to the open edge part 21c where the inside wall surface 241 and the outer surface 21b intersect becomes within a predetermined value, the movement of the pipe electrode 10 to the left is stopped so as to prevent the open edge part 21c being mistakenly machined by the pipe electrode 10.

(3) Straight Part Machining Process

Figure 9:
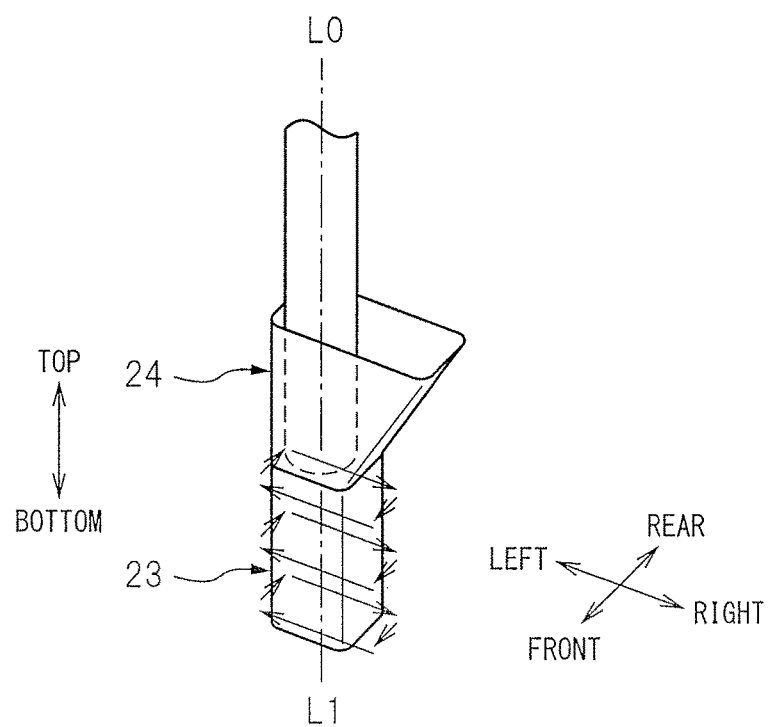
FIG. 9 is a view which shows a path of movement of a pipe electrode in a straight part machining process which is included in an electrodischarge machining method according to an embodiment of the present invention.

Next, the pivot member 14 is inclined, as shown in FIG. 5, in the same way as in the inclined part machining process, to change the posture of the workpiece 20 so that the center axis L1 of the cooling hole 22 extends in the top-bottom direction. In this case, it is sufficient to make the pivot member 14 incline in the opposite direction by exactly the amount of incline (90 degrees) in the inside wall surface machining process and make the position of the pivot member 14 return to the state of the inclined part machining process. With this posture, as shown in FIG. 9, the front end part of the pipe electrode 10 is made to move relative to the workpiece 20 in the front-rear and left-right directions (arrow mark directions of FIG. 5) corresponding to the position of the inside wall surfaces 231 to 234 of the inside wall surfaces 231 to 234 of the cooling hole 22 and the circumference and the bottom surface of the pipe electrode 10 are used to machine the blade part 21 in a laminar form. This laminar machining is repeated while making the front end part of the pipe electrode 10 gradually descend until the pipe electrode 10 penetrates through the blade part 21. Due to this, a straight part 23 which has inside wall surfaces 231 to 234 and corner parts 235 to 238 is formed.

By the above electrodischarge machining method, a cooling hole 22 is formed in the blade part 21 of the workpiece 20. This electrodischarge machining method is repeatedly applied at a plurality of machining positions for cooling holes 22. The above-mentioned inclined part machining process, inside wall surface machining process, and straight part machining process are automatically performed by a not shown NC apparatus controlling the servo motors in accordance with a predetermined machining program.

According to the present embodiment, it is possible to obtain the following actions and effects.

(1) The pipe electrode 10 is arranged so that its axis L0 becomes parallel to the center axis L1 of the cooling hole 22 while making it move relative to the workpiece 20 to form an inclined part 24 (inclined part machining process; FIG. 6), the pipe electrode 10 is arranged so that its axis L0 becomes vertical to the inclined inside wall surface 243 of the inclined part 24 while making the pipe electrode 10 move relative to the workpiece 20 to form the corner parts 246 and 247 of the both sides of the inside wall surface 243 of the inclined part 24 (inside wall surface machining process; FIG. 7, FIG. 8), and, furthermore, the pipe electrode 10 is arranged so that its axis L0 becomes parallel to the center axis L1 while making the pipe electrode 10 move relative to the workpiece 20 to form the straight part 23 (straight part machining process; FIG. 9). Due to this, the corner parts 246 and 247 at the both sides of the inside wall surface 243 can be given radii of curvature smaller than the electrode radius of the pipe electrode 10, cooling air can be made to flow out efficiently from the cooling hole 22, and the cooling efficiency of the blade part 21 can be improved.

(2) After performing the inclined part machining process, the inside wall surface machining process is performed, next the straight part machining process is performed. Due to this, burrs which are formed in the inclined part machining process or inside wall surface machining process at the border between the straight part 23 and the inclined part 24 can be removed by the straight part machining process.

(3) At the time of electrodischarge machining, the pipe electrode 10 is made to rotate, so the bottom surface 10a of the pipe electrode 10 is uniformly consumed and the machined surface of the workpiece 20 can be uniformly formed. In particular, in the present embodiment, at the inside wall surface machining process, the bottom surface 10a of the pipe electrode 10 is made to face the inside wall surface 243 and the corner parts 246 and 247 are formed by electrodischarge machining, so by making the pipe electrode 10 rotate, the corner parts 246 and 247 can be uniformly formed.

Note that, in the above embodiment, in the inclined part machining process and the straight part machining process, the pipe electrode 10 is moved relative to the workpiece 20 in the XY directions to form a cooling hole 22 in a laminar form while gradually making the depth of the cooling hole 22 deeper, but the machining methods in these processes are not limited to the ones explained above. For example, it is possible to form the prepared hole at the blade part 21 along the center axis L1 in advance, then form the inclined part 24 and straight part 23. In the above embodiment, a cylindrical shaped pipe electrode 10 is used, but a columnar shape electrode may also be used instead of this.

The pipe electrode 10 is arranged with respect to the workpiece 10 so that the center axis L1 of the cooling hole 22 is parallel to the axis L0 of the pipe electrode 10, but if arranging the pipe electrode 10 so as to extends in the depth direction of the cooling hole 22, the center axis L1 and the axis L0 need not be parallel. In the inside wall surface machining process, the pipe electrode 10 is arranged so that the axis L0 is vertical to the inside wall surface 243 of the inclined part 24, but the "vertical" in this case is not only vertical in the strict sense, but also includes substantially vertical, that is, approximately vertical.

In the above embodiment, the cross-sectional shapes of the straight part 23 and inclined part 24 of the cooling hole 22 are rectangular shapes, and the arc shaped corner parts 246 and 247 at the both sides of the inside wall surface 243 slanted with respect to the straight part 23 (slanted inside wall surface) are machined by electrodischarge machining to remove parts (arc parts) of the corner parts 246 and 247 to render the corner parts 246, 247 right angle or substantially right angle shapes, but the cross-sectional shapes may also be other than rectangular shapes (for example, circular shapes, elliptical shapes, triangular shapes, etc.). FIG. 10 is a view which shows a modification of FIG. 5. The straight part 23 and inclined part 24 are formed in circular shapes. A pipe electrode 10 with an outside diameter substantially the same as the cross-sectional shape of the straight part 23 is used. The straight part 23 is formed by feeding the pipe electrode 10 in only the Z-axis direction. The inclined part 24 is formed in the same way as FIG. 6 by using the circumference and bottom surface of the pipe electrode 10 to machine the blade part 21 in a laminar form. In this case as well, the arc shaped corner parts 24b and 24c (hatched part) at the both sides of the inside wall surface (slanted inside wall surface 24a) of the inclined part 24 slanted with respect to the straight part 23 are removed by the pipe electrode 10 whereby right angle or substantially right angle shape corner parts are formed.

In the above embodiment, the inclined part machining process is performed, then the inside wall surface machining process is performed and furthermore the straight part machining process is performed, but the order of the machining processes is not limited to this. For example, it is also possible to perform the inclined part machining process, then perform the straight part machining process, then perform the inside wall surface machining process. The electrodischarge machining method according to the present invention can be realized by other than the above-mentioned electrodischarge machine 100 (FIG. 1) as well. The form of the electrodischarge machine is not limited to the one obtained above.

In the above embodiment, the electrodischarge machining method according to the present invention is applied to formation of a cooling hole 22 in a turbine blade 20, but it is possible to similarly apply the electrodischarge machining method according to the present invention even when forming a broadening opening, that is, another through hole having a diffuser shape. Therefore, it is possible to apply the electrodischarge machining method according to the present invention not only when forming the corner parts 246 and 247 of the inside wall surface 243, but also when machining the inside wall surface 243 of the inclined part 24 by various machining. That is, the present invention is not limited to the electrodischarge machining method of the embodiment so long as the features and functions of the present invention can be realized.

Figure 12A:
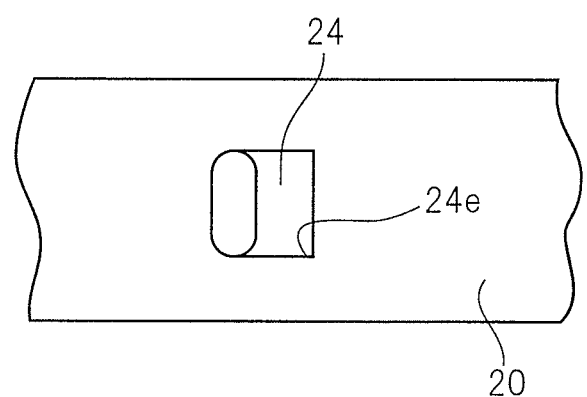
Figure 12B:
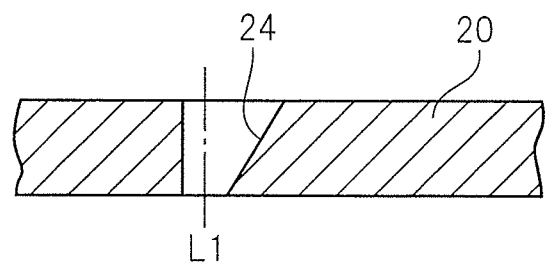

FIGS. 11A, 11B, 12A, and 12B show other modifications of the through holes. In the figures, 11A and 12A are plan views while 11B and 12B are cross-sectional views. The modifications of FIGS. 11A, 11B, 12A, and 12B have no straight parts and have through holes formed in the workpiece 20 only at the inclined parts 24. The inclined part 24 of the through hole of FIGS. 11A and 11B is comprised of four inside wall surfaces formed in a hopper shape. The four inside wall surfaces make the columnar or cylindrically shaped electrode and the workpiece 20 slant so that the electrode becomes vertical to the four inside wall surfaces at its axis and make them move relatively for electrodischarge machining, so the intersecting line parts 24d of the inside wall surfaces are machined to have right angles in which the radii are substantially zero. Each of the inclined parts 24 of the through hole of FIGS. 12A and 12B is comprised of just a single inside wall surface. The electrode and workpiece 20 are tilted so that an axis of a columnar or cylindrical shaped electrode becomes vertical to this inside wall surface and are made to move relatively for electrodischarge machining, so the corner part 24e with the vertical inside wall surface is machined to have right angles in which the radii are substantially zero.

According to the present invention, a pipe electrode is arranged so that an axis of the pipe electrode becomes vertical to an inside wall surface of an inclined part of a cooling hole while making the pipe electrode move relative to the workpiece to machine an inside wall surface of the inclined part by electrodischarge machining, so it is possible to easily form arc parts etc. with radii of curvature smaller than the electrode diameter of the pipe electrode at the inside wall surface of the inclined part.

REFERENCE SIGNS LIST 10 pipe electrode
20 workpiece (turbine blade)
22 cooling holes
23 straight part
24 inclined part
243 inside wall surface
L0 axis
L1 center axis

The invention claimed is:

1. An electrodischarge machining method which uses an electrodischarge machine which is provided with a columnar or cylindrical shaped electrode so as to form a through hole which has a straight part and an inclined part connected with the straight part in a workpiece, comprising:
   an inclined part machining process which arranges the electrode so that an axis of the electrode extends in a depth direction of the through hole while making the electrode move relative to the workpiece and uses electrodischarge machining to form the inclined part;
   a straight part machining process which arranges the electrode so that the axis of the electrode extends in the depth direction of the through hole while making the electrode move relative to the workpiece and uses electrodischarge machining to form the straight part; and
   an inside wall surface machining process which arranges the electrode so that the axis of the electrode becomes perpendicular to an inside wall surface of the inclined part which is formed by the inclined part machining process while making the electrode move relative to the workpiece to machine the inside wall surface of the inclined part by electrodischarge machining.

2. The electrodischarge machining method according to claim 1, wherein the inside wall surface machining process machines an arc part of the inside wall surface corresponding to an electrode diameter of the electrode which is formed by the inclined part machining process by the bottom surface or circumferential surface of the electrode by electrodischarge machining while making the electrode rotate about the axis.

3. The electrodischarge machining method according to claim 1, wherein the straight part machining process makes the electrode move relative to the workpiece in an axial direction of the electrode to machine the cross-section to a circular shape by electrodischarge machining.

4. The electrodischarge machining method according to claim 1, wherein the inclined part machining process is performed, then the inside wall surface machining process is performed, then the straight part machining process is performed.

* * * * *